Sept. 15, 1964 P. DOSCH 3,148,687
ARTICLE WASHING MACHINE INCLUDING A WATER SOFTENING ARRANGEMENT
Filed May 15, 1962
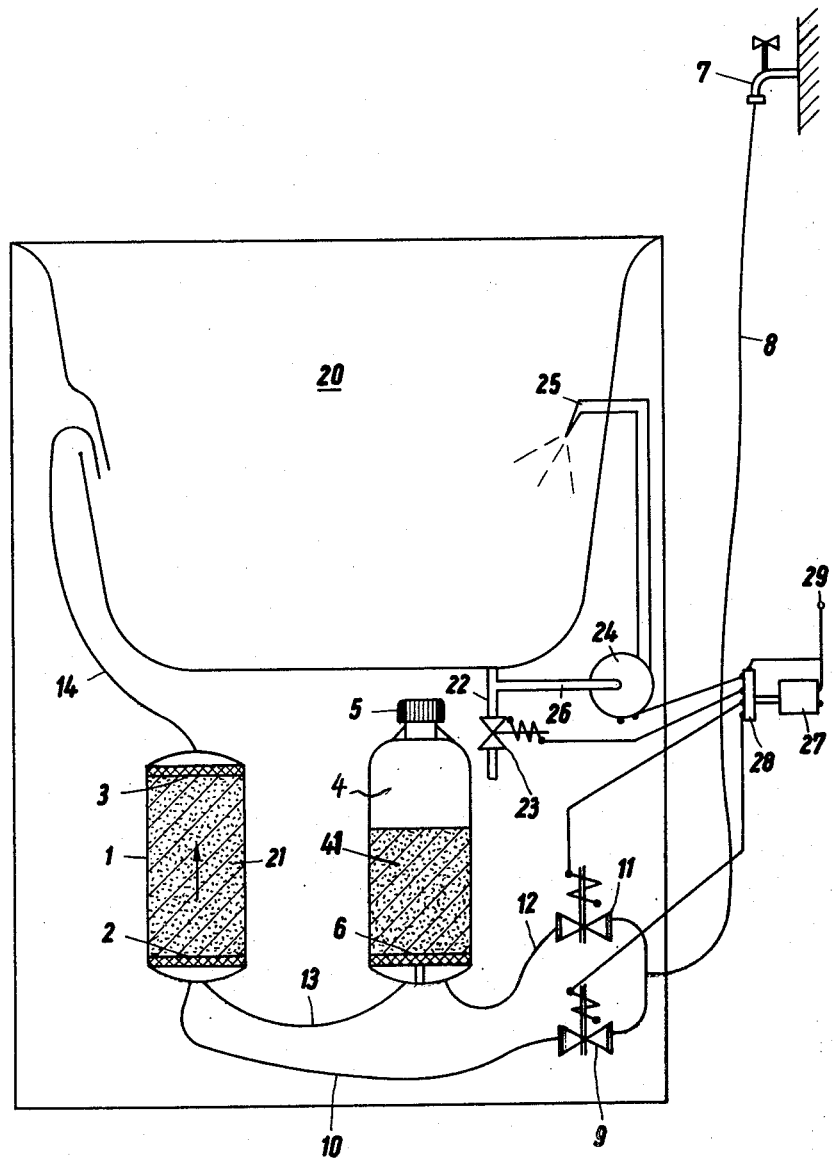
Inventor:
Paul Dosch
By: Hans Beeman
Agent

United States Patent Office 3,148,687
Patented Sept. 15, 1964

3,148,687
ARTICLE WASHING MACHINE INCLUDING A
WATER SOFTENING ARRANGEMENT
Paul Dosch, Am Oberen Luisenpark 21,
Mannheim, Germany
Filed May 15, 1962, Ser. No. 194,913
Claims priority, application Germany, May 20, 1961,
D 36,143; Feb. 22, 1962, D 38,213, D 38,214
4 Claims. (Cl. 134—58)

This invention relates to ion exchangers, and more particularly to a water softener arrangement for automatic domestic laundry apparatus and automatic domestic dish washers.

The advantages of soft water in the cleaning of clothing, of dishes and of kitchen utensils are well established. Soft water permits a wider choice of natural and synthetic detergents without precipitation of hard water constituents, or of compounds generated by reaction of the hard water constituents with the detergent or with the soil to be removed. Water softeners are widely used in households where the water supply contains such hardness formers as calcium and magnesium ions.

Natural and synthetic zeolites and synthetic ion exchange resins are used almost exclusively for domestic water softeners. They are usually of the cation exchanger type, and replace calcium, magnesium, and other polyvalent metal ions in the water with sodium ions in the exchanger to form sodium salts in the water, whereas calcium and similar ions are retained. When the cation exchangers are saturated with the ions that are to be removed from the water, they become ineffective and must be regenerated. Passing a strong solution of sodium ions through the bed of ion exchange material reverses the ion exchange process. The sodium ions in the regenerating solution displace the hardness forming polyvalent metal ions which are eluted.

The usual cycle of operation of an ion exchange apparatus involves the sequential steps of water softening, backwashing, regenerating, and rinsing. In the usual column arrangement in which a bed of ion exchange material is held in a container having openings at the top and bottom, water flows during the softening step from the top down. During backwashing, liquid flows from the bottom upward. A regenerating liquid is commonly passed from the top down, and rinse water also is passed from the top down to displace excess regenerating solution. Other modes of operation also are employed, but a reversal in the direction of flow in at least one operating step is necessary in conventional equipment.

It is customary in large ion exchange installations to provide two columns of which one may be used for water softening while the other one is being regenerated. Such an arrangement is not practical for most domestic applications because of its high initial cost, the large space occupied, and the relative complexity of the necessary valve system.

This invention is more particularly concerned with small water softening units which require so little space that they may be built into conventional automatic laundry equipment or automatic dishwashers without basic changes in the functions and the appearance of the equipment.

The object of the invention is a water softening apparatus capable of continuous operation with a minimum of maintenance work on the part of the user.

Another object is the provision of water softening apparatus requiring so little space that it may be located within the shells of existing washing equipment.

A more specific object is the provision of water softening apparatus which is never under the full pressure of the water line or other source from which hard water is drawn so that problems of leakage are virtually non-existent.

With these and other objects in view, the water softening apparatus of the invention provides a substantially closed vessel which contains the ion exchange material. A conduit equipped with a valve connects the bottom portion of the vessel to a source of hard water under pressure, such as the pump of a well or a water main. The top portion of the vessel communicates with a conduit which is permanently open to the atmosphere so that, in the normal water softening operation of the device, water passes under the pressure of the source through the ion exchange material from the bottom to the top, and leaves the vessel through the permanently open conduit. The pressure within the vessel can never reach the same value as the liquid pressure of the source.

Regenerating means are provided for feeding an aqueous solution of a regenerating agent, such as common salt, to the bottom portion of the vessel. The regenerating agent thus is passed through the vessel in an upward direction while the valve connecting the vessel with the water source is closed. When the valve is opened again, the first amount of water passing through the ion exchange bed displaces the excess regenerating solution. All materials are discharged through the same conduit.

When the water softener arrangement described above is made an integral part of a cloth washing machine or of a dishwasher, the liquid discharged from the ion exchange column is fed into the tub or drum of the washing apparatus.

Other features and many of the attendant advantages of this invention will be readily appreciated as the same becomes better understood by reference to the following detailed description when considered in connection with the accompanying drawing wherein:

FIG. 1 shows a domestic dishwasher equipped with the water softening apparatus of the invention in elevational, partly sectional view.

Referring now to the drawing in detail, there is seen an automatic dishwasher of largely conventional structure which is shown only to the extent required for an understanding of the invention. An integral part of the dishwasher is an upright cylindrical column 1 mounted within the dishwasher shell and equipped with radial internal partitions 2 and 3 adjacent respective axial ends of the column 1. The partitions 2, 3 are perforated to permit the passage of water, but to retain therebetween a granular ion exchange material 21 which may be a synthetic resin cation exchange material of any suitable conventional type, or a synthetic or natural zeolite.

The bottom end of the column 1 is connected by a tube 13 with the bottom of another container 4 in the dishwasher shell. The top of the container 4 is closed by a removable cap 5 which is accessible from outside the shell. A perforated partition 6 above the bottom portion of the container 4 retains a supply of regenerating agent 41 such as sodium chloride crystals.

The source of the hard water which is to be softened by the apparatus is represented by a hot water wall faucet 7 to which a pressure resistant flexible hose 8 is attached. The hose 8 is attached to a solenoid valve 9 which is the intake or feed valve of the dishwasher. The valve 9 is connected to the bottom of the ion exchange column 1 by a feed conduit 10. A solenoid control valve 11 communicates with the hose 8 and is connected to the bottom of the container 4 by a conduit 12. A portion of the partition 6 is arranged between the orifices of the conduits 12 and 13 at the bottom of the container 4 so as to prevent liquid from by-passing the regenerating agent 41 when passing from the conduit 12 through the container 4 into the conduit 13.

The current top of the column 1 has one end of a conduit 14 attached thereto. The other end of the conduit 14 is attached to the tub 20 of the dishwasher in such a manner that the conduit 14 is open to the tub cavity at all times and is above the maximum water level maintained by a float actuated valve in the usual manner not further illustrated.

A discharge conduit 22 at the bottom of the tub 20 is equipped with a solenoid valve 23 for gravity discharge of liquid from the tub 20. A motor-driven centrifugal circulating pump 24 agitates the liquid in the tub by discharging it in a jet from a nozzle 25, and by drawing it from the bottom of the tub 20 through a suction line 26.

The electrical control system of the dishwasher is only shown to the extent of its cooperation with the water softening unit. It includes a small synchronous constant speed gear motor 27 which drives a rotary timing switch 28. A source of electric current 29 is connected to the motor 27 and to an input terminal of the timing switch 28. The four outlet terminals of the switch 28 illustrated in the drawing are respectively connected to the solenoid valves 9, 11, 23, and to the motor of the pump 24. Only one conductor of the electrical system has been shown. It will be understood that the source 29, the motor 27, the pump 24, and the valves 9, 11, 23 each have a second terminal, and that these second terminals are directly connected in a conventional manner not shown in order not to crowd the drawing.

The dishwasher illustrated in FIG. 1 operates as follows:

The dishwasher tub 20 is charged with the dishes or kitchen utensils to be washed, and detergent is supplied in the usual manner. The container 4 is supplied with salt through its top opening which is then sealed by the cap 5. The current source 29 is energized by closing a non-illustrated switch. The motor 27 is thereby started, and all further operations of the dishwasher cycle are performed automatically by the sequential opening and closing of circuits in the switch 28.

Water is supplied as required during the washing cycle through the opened feed valve 9, whereby the water is passed through the ion exchange bed 21 and softened prior to its admission to the tub 20. The valve 11 remains closed throughout the initial conventional stages of the dishwashing cycle which may include the following steps:

(a) admission of a first batch of water to the tub 20;
(b) circulation of the water by the pump 24 for a preliminary rinsing of the dishes and mechanical removal of gross soil;
(c) discharge of the first rinse liquid;
(d) admission of a second batch of water and of detergent;
(e) circulation of the detergent solution in the washing step proper by the pump 24;
(f) discharge of the soiled detergent solution;
(g) admission of a third batch of water;
(h) rinsing by circulation;
(i) discharge of the rinse water;
(j) admission of a fourth batch of water;
(k) final rinsing;
(l) discharge of the final rinse water.

After the final rinse water has been substantially drained off, and while the valve 9 remains closed and the valve 23 is open, the control valve 11 is briefly opened. The time of opening is selected to permit the passage of sufficient water through the valve 11, the conduit 12, the container 4, and the tube 13 to replace at least a major portion of the water in the column 1 by the strong or saturated regenerating salt solution which forms in the container 4. Control of the volume of regenerating solution is not overly critical since an excess will merely overflow from the feed conduit 14 into the tub 20, and is discharged through the conduit 22 to waste.

The valve 11 is then closed and hot air produced by a non-illustrated electric heater and blower connected to the rotary switch 28 in a conventional manner is admitted to the tub to dry the clean dishes or utensils.

The dishwasher may now be unloaded and is ready for the next charge. During the admission of water for the preliminary rinsing of the next charge, a solution containing the chlorides of the hardness forming elements such as calcium and magnesium together with excess sodium chloride is discharged from the column 1. It is preferred briefly to delay closing of the solenoid valve 23 until the chlorides are washed from the ion exchange material and the tub 20, and discharged to waste. In view of the very small volume of the column 1 as compared to the tub 20, it may be permissible to merely dilute the chloride solution for the preliminary rinse, and to drain the diluted solution to waste prior to the actual washing step.

Obviously, the contacts of the switch 28 may be arranged in many other ways to make the regeneration of the ion exchange bed 21 an integral and automatic part of any desired dishwashing cycle. The operator's part in the water softening process is limited to replacement of dissolved common salt in the container 4.

The container 4 is preferably arranged on the same level as the ion exchange column 1 in the manner illustrated, and the cap 5 is made to provide an airtight closure. When the cap 5 is opened while the valves 9 and 11 are closed, the liquid in the column 1, the conduit 14, and the container 4 seeks a common level and partially fills the container 4 as shown in the drawing. The liquid level in the container 4 is maintained as long as the cap 5 is closed.

The water softening apparatus illustrated in FIG. 1 is suitable for use with a cloth washing machine without significant change. The structural elements shown in FIG. 1 find their equivalents is most domestic laundry machines with the exception of the circulating pump 24 which is normally replaced by a mechanical agitator in a stationary tub, or by a motor driven rotatable drum holding the cloths to be laundered. The mechanical agitator or rotatable drum perform the same agitating function as the pump 24 in providing relative movement between the articles to be cleaned and the aqueous liquids employed in the cleaning cycle.

A washing machine for dishes or for cloths may be arranged for discharge of waste liquids under pressure by suitably connecting the pump 24 or a separate discharge pump with the conduit 22. The washing machines of the invention may obviously be modified in this well known manner without significant change in the novel features of this invention.

If the column 1 is of a size to acommodate an amount of ion exchange material sufficient for a single washing cycle only, it may be accommodated in the air space normally provided between the back of a dishwasher and an adjacent wall for electrical and plumbing connections. A column which fits easily into a portion of this air space or into other unused space found in every dishwasher shell is preferably made big enough to accommodate somewhat more ion exchange material than will be required for one washing cycle under the most unfavorable conditions of water hardness that have to be taken into consideration. This prevents complete exhaustion of the ion exchange capacity of the column during each cycle.

If the available space within the shell permits, the ion exchange column may be made large enough to soften the water for two or more consecutive washing cycles. The necessary modification of the timing arrangement for opening the valve 11 in FIG. 1 only after two or more cycles is well within the skill of the art, and does not require further description.

The water softening arrangement of the invention is of utmost simplicity of structure and operation. Even in the fully automatic embodiment of the invention shown in FIG. 1, the water softening apparatus requires only one solenoid valve in addition to the normal components of the automatic control system of a dishwasher or a laundry washer. The fluid pressure in the ion exchange apparatus is limited to the low hydrostatic pressure of liquid columns open to the atmosphere in the feed conduits which communicate with the tub 20. This hydrostatic pressure is temporarily augmented by the friction head of the flowing water within the washing machine. The pressure in the ion exchange system is at all times substantially lower than the pressure of the water source, or the pressure at the intake end of the feed valve 9 which becomes equal to the source pressure when the valve is closed since the faucet 8 is normally open.

Operation of the water softening apparatus is limited to replenishment of salt. Back washing is unnecessary, and all other steps of the water softening cycle are performed automatically in conjunction with the normal operation of the washing machine. In all steps of the softening cycle, liquid flows through the column 1 in the same upward direction.

Because of its simplicity and its low operating pressure, the water softening apparatus of the invention is relatively inexpensive to build, and easy to maintain. Leakage danger due to the high operating pressure used in many conventional ion-exchange systems need not be taken in consideration in designing arrangements according to this invention, and leakage does not present an operational problem requiring maintenance work.

Obviously many modifications and variations of the present invention are possible in the light of the above teachings. It is therefore to be understood that, within the scope of the appended claims, the invention may be practiced otherwise than as specifically disclosed.

What is claimed is:

1. In a washing machine, in combination:
   (a) tub means;
   (b) means for agitating a liquid contained in said tub means;
   (c) a discharge conduit communicating with said tub means for discharging a liquid therefrom;
   (d) discharge valve means in said discharge conduit;
   (e) a source of hard water under pressure;
   (f) a substantially closed vessel having a bottom portion and a top portion;
   (g) a first conduit communicating with said source and with said bottom portion;
   (h) a feed valve in said feed conduit;
   (i) a second conduit permanently communicating with said tub means and said top portion;
   (j) said vessel being adapted to contain ion exchange media capable of being regenerated by contact with an aqueous solution of a regenerating agent;
   (k) regenerating means for feeding an aqueous solution of said regenerating agent to said bottom portion under pressure; and
   (l) control means for actuating said feed valve, said agitating means, said discharge valve means, and said regenerating means in predetermined timed sequence.

2. In a washing machine, in combination:
   (a) tub means;
   (b) agitating means for agitating a liquid contained in said tub means;
   (c) a discharge conduit communicating with said tub means for discharging a liquid therefrom;
   (d) discharge valve means in said discharge conduit;
   (e) a source of hard water under pressure;
   (f) a substantially closed vessel having a bottom portion and a top portion;
   (g) a first conduit communicating with said source and with said bottom portion;
   (h) a feed valve in said feed conduit;
   (i) a second conduit permanently communicating with said tub means and said top portion;
   (j) said vessel being adapted to contain ion exchange media capable of being regenerated by contact with an aqueous solution of a regenerating agent;
   (k) a container permanently communicating with said bottom portion, said container being adapted to contain a supply of said regenerating agent;
   (l) a third conduit communicating with said container and with said source of hard water;
   (m) a control valve in said third conduit; and
   (n) control means for actuating said feed valve, said agitating means, said discharge valve means, and said control valve in predetermined timed sequence.

3. In a washing machine as set forth in claim 2, said valves, said discharged valve means, and said agitating means being electrically actuated, and said control means including a source of electric current, and timing switch means in circuit with said source of current, said valves, and said agitating means for selectively connecting said valves and said agitating means to said source in predetermined timed sequence.

4. In a water softening apparatus, in combination:
   (a) a substantially closed vessel having a bottom portion and a top portion;
   (b) a source of hard water under pressure;
   (c) a first conduit communicating with said source and with said bottom portion;
   (d) a valve in said conduit;
   (e) a second conduit permanently open to the atmosphere and communicating with said top portion;
   (f) said vessel being adapted to contain ion exchange media capable of being regenerated by contact with an aqueous solution of a regenerating agent;
   (g) a container communicating with said bottom portion, said container being adapted to contain a supply of said regenerating agent;
   (h) a third conduit communicating with said container and with said source of hard water;
   (i) another valve in said third conduit; and
   (j) control means for opening and closing said valves in predetermined timed sequence.

References Cited in the file of this patent

UNITED STATES PATENTS

| | | |
|---|---|---|
| 1,202,557 | Massaciu | Oct. 24, 1916 |
| 1,426,638 | Hepburn | Aug. 22, 1922 |
| 1,620,886 | Green | Mar. 15, 1927 |
| 1,652,710 | Doterweich | Dec. 13, 1927 |
| 1,697,095 | Turner | Jan. 1, 1929 |
| 1,759,601 | Apeldorn | May 20, 1930 |
| 2,292,814 | Mariffi | Aug. 11, 1942 |
| 2,355,455 | McPhilomy | Aug. 8, 1944 |
| 2,434,352 | Edwards | Jan. 13, 1948 |
| 2,681,658 | Meeker | June 22, 1954 |
| 2,715,408 | Stanitz | Aug. 16, 1955 |